United States Patent [19]
Govoni et al.

[11] Patent Number: 5,589,549
[45] Date of Patent: Dec. 31, 1996

[54] MULTISTAGE PROCESS FOR THE (CO) POLYMERIZATION OF OLEFINS

[75] Inventors: Gabriele Govoni, Renazzo; Mario Sacchetti, Ferrara; Stefano Pasquali, Fossanova San Marco, all of Italy

[73] Assignee: Montell Technology Company bv, Hoofddorp, Netherlands

[21] Appl. No.: 461,136

[22] Filed: Jun. 5, 1995

[30] Foreign Application Priority Data

Jul. 20, 1994 [IT] Italy ................... MI94A1515

[51] Int. Cl.$^6$ .................. C08F 295/00; C08F 10/06
[52] U.S. Cl. ................. 525/247; 525/52; 525/53; 525/242; 525/245; 525/297; 525/319; 525/320; 525/322; 526/64; 526/65; 526/127; 526/160; 526/124.3; 526/901; 526/943
[58] Field of Search ............... 525/52, 53, 242, 525/247, 245, 297, 319, 320, 321, 322, 323; 526/64, 65, 160, 127, 124.3; 521/144, 146

[56] References Cited

U.S. PATENT DOCUMENTS

| | | |
|---|---|---|
| 4,298,718 | 11/1981 | Mayr et al. . |
| 4,495,338 | 2/1985 | Mayr et al. . |
| 4,521,566 | 6/1985 | Galli et al. . |
| 4,550,145 | 10/1985 | Kasahara et al. ............... 525/247 X |
| 5,132,262 | 7/1992 | Rieger et al. . |
| 5,322,902 | 6/1994 | Schreck et al. ............... 525/247 |
| 5,428,110 | 6/1995 | Uehara et al. ............... 525/247 |
| 5,449,738 | 9/1995 | Koura et al. ............... 525/247 |
| 5,468,810 | 11/1995 | Hayakawa et al. ............... 525/247 X |
| 5,486,572 | 1/1996 | Fujita et al. ............... 525/247 |

FOREIGN PATENT DOCUMENTS

| | | |
|---|---|---|
| 0361493A1 | 4/1990 | European Pat. Off. . |
| 0395083A2 | 10/1990 | European Pat. Off. . |
| 0433990A2 | 6/1991 | European Pat. Off. . |
| 0433989A2 | 6/1991 | European Pat. Off. . |
| 0485822A2 | 5/1992 | European Pat. Off. . |
| 0485820A2 | 5/1992 | European Pat. Off. . |
| 4130429A1 | 3/1993 | European Pat. Off. . |
| 0549900A1 | 7/1993 | European Pat. Off. . |
| 0553805A1 | 8/1993 | European Pat. Off. . |
| 0553806A1 | 8/1993 | European Pat. Off. . |
| 0604917A2 | 7/1994 | European Pat. Off. . |
| 0624604A1 | 11/1994 | European Pat. Off. . |
| 0632065A1 | 1/1995 | European Pat. Off. . |
| 0632066A1 | 1/1995 | European Pat. Off. . |
| 0643078A2 | 3/1995 | European Pat. Off. . |
| 0643079A2 | 3/1995 | European Pat. Off. . |
| WO93/19107 | 9/1993 | WIPO . |

*Primary Examiner*—Fred Teskin
*Attorney, Agent, or Firm*—Bryan Cave LLP

[57] ABSTRACT

Multistage process for the polymerization of olefins $CH_2=CHR$, where R is hydrogen or an alkyl, cycloalkyl or aryl radical with 1–10 carbon atoms, comprising two stages of polymerization. In a first stage, in the presence of a titanium or a vanadium catalyst and working in one or more reactors, an olefinic polymer with particular values of porosity is prepared; in a second stage, in the presence of the said porous polymer and a metallocene compound and/or their reaction products, one or more olefins, that are equal to or different from those polymerized in the first stage, are polymerized in one or more reactors.

22 Claims, 2 Drawing Sheets

MULTISTAGE PROCESS FOR THE (CO) POLYMERIZATION OF OLEFINS

The present invention relates to a multistage process for the polymerization of olefins $CH_2=CHR$, where R is hydrogen or an alkyl, cycloalkyl or aryl radical with 1–10 carbon atoms. In a first stage, carried out in one or more reactors, one or more of the said olefins are polymerized in the presence of a catalyst comprising the reaction product of an alkyl-Al compound with a compound of Ti and/or V supported on a magnesium halide in active form, obtaining an olefinic polymer that has particular values of porosity. In a second stage of polymerization, one or more of said olefins $CH_2=CHR$ are polymerized in the presence of the product obtained by bringing said porous polymer into contact with a compound of a transition metal M containing at least one M-$\pi$ bond, obtaining new polymer compositions directly from the reactors.

Multistage processes for the polymerization of olefins, carried out in two or more reactors, are known from the patent literature and are of particular interest in industrial practice. The possibility of independently varying, in any reactor, process parameters such as temperature, pressure, type and concentration of monomers, concentration of hydrogen or other molecular weight regulator, provides much greater flexibility in controlling the composition and the properties of the end product compared with single-stage processes. Multistage processes are generally carried out using the same catalyst in the various stages/reactors: the product obtained in one reactor is discharged and sent directly to the next stage/reactor without altering the nature of the catalyst.

Multistage processes find application for example in the preparation of olefin (co)polymers with broad molecular weight distribution (MWD), by producing polymer fractions with different molecular weight in the various reactors. The molecular weight in each reactor, and therefore the range of the MWD of the final product, is generally controlled by using a molecular weight regulator, which is preferably hydrogen. Multistage processes are also used in the preparation of high-impact copolymers of propylene by sequential polymerization of propylene and of mixtures of propylene with ethylene. In a first stage, propylene is homopolymerized or copolymerized with smaller proportions of ethylene and/or olefins having 4–10 carbon atoms, obtaining a stereoregular polymer; in a second stage, mixtures of ethylene and propylene are polymerized in the presence of the polymer including the catalyst that is obtained in the first stage, obtaining polypropylene compositions that have improved impact strength.

Processes of this type are described for example in U.S. Pat. No. 4,521,566. In said patent, polypropylene compositions having high impact strength are prepared in a multistage process which comprises at least one stage of homopolymerization of propylene and at least one stage of polymerization of ethylene/propylene mixtures in the presence, in both stages, of a catalyst comprising a compound of titanium supported on a magnesium halide in active form.

European patent application EP-A-433989 describes a process for preparing polypropylene compositions containing from 20 to 99% by weight of a crystalline (co)polymer, containing at least 95% by weight of propylene units, and from 1 to 80% by weight of a non-crystalline ethylene/propylene copolymer, containing from 20 to 90% by weight of ethylene units. The process is effected in 2 stages: in a first stage, carried out in liquid propylene, the crystalline propylene (co)polymer is produced, and in a second stage, carried out in a hydrocarbon solvent, the non-crystalline ethylene/propylene copolymer is produced. The same catalyst, consisting of a chiral metallocene and an aluminoxane, is used in both stages.

European patent application EP-A-433990 describes a process in two stages for the preparation of propylene-based polymer compositions similar to those described in EP-A-433989. In the first stage the crystalline propylene (co)polymer is produced by polymerization in liquid propylene, and in the second stage the non-crystalline ethylene-propylene copolymer is produced by gas-phase polymerization. Also in this case, the same catalyst, consisting of a chiral metallocene and an aluminoxane, is used in both reactors.

German patent application DE 4130429 describes a multistage process for the production of block copolymers, carried out entirely in the gas phase. In a first stage a propylene homo or copolymer matrix is produced in a quantity between 45 and 95% by weight based on the total product; in a second stage, carried out in the presence of the polypropylene matrix previously produced and the catalyst used therein, an ethylene/α-olefin copolymer is prepared, containing from 0.1 to 79.9% by weight of ethylene units, in a quantity of between 5 and 55% by weight based on the total product. In both stages, polyme-rization is carried out in the gas-phase using the same metallocene catalyst.

The processes of the state of the art have various limitations, one of which derives from the fact that the same catalyst is used in the different process stages and therefore the characteristics of the products obtained in the individual stages are not always optimum. For example, in the case of the heterophase copolymers prepared in multistage processes using non-metallocene Ti-based catalysts, the properties of the rubbery copolymer produced in the second stage are poor. It is known in fact that said catalysts produce ethylene/propylene copolymers containing relatively long sequences of the same monomer unit and consequently the elastomeric properties of the product are poor.

It has now been found a multistage process by which it is possible to prepare a wide range of olefinic polymer compositions, working with different catalyst systems in the various stages. In particular, the process of the invention comprises a first stage in which, in the presence of titanium or vanadium catalysts, an olefinic polymer having particular values of porosity is prepared, and a second stage in which, in the presence of said porous polymer and a metallocene compound and/or their reaction products, one or more olefins are polymerized, said olefins being identical to or different from those polymerized in the first stage.

Figure 1:
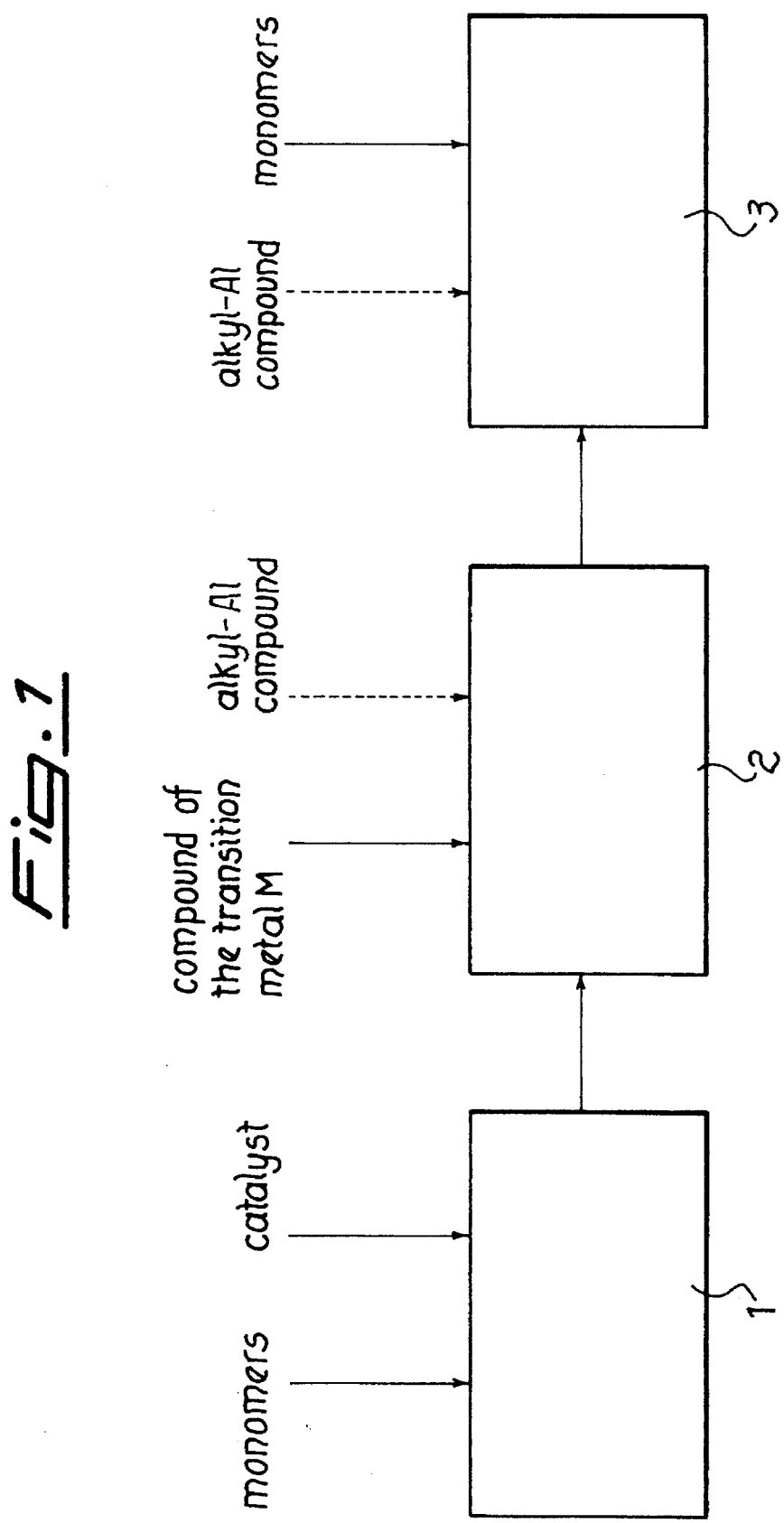
FIG. 1 is a block diagram of the multistage process of the invention.

The process of the invention is characterized in that it comprises:

(I) a first stage of polymerization, in which one or more of said olefins $CH_2=CHR$ are polymerized, in one or more reactors, in the presence of a catalyst comprising the product of the reaction between an alkyl-Al compound and a solid component comprising at least one compound of a transition metal $M'$ selected from Ti or V and not containing $M'$-$\pi$ bonds and a halide of Mg in active form, said catalyst being capable of producing an olefinic polymer that has porosity, expressed as percentage of voids, greater than 5%;

(II) a treatment stage, in which the polymer obtained in said first stage of polymerization (I) is contacted with a compound of a transition metal M selected from Ti, V, Zr and Hf containing at least one M-π bond and optionally with an alkyl-Al compound;

(III) a second stage of polymerization, in which one or more of said olefins $CH_2$=CHR are polymerized, in one or more reactors, in the presence of the product obtained in said treatment stage (II).

Preferably, the porosity of the polymer produced in the first stage of polymerization (I) is greater than 10% and more preferably greater than 15%. Porosity values as high as 35–40% or greater are possible.

Preferably the polymers produced in the first stage of polymerization (I) are characterized by the fact that they have macroporosity. In general, more than 40% of the porosity of said polymers is due to pores with diameter greater than 10000 Å. When the porosity of the polymer produced in the first stage of polymerization (I) is greater than 15%, the distribution of pore radius is preferably such that more than 90% of the porosity is due to pores with diameter greater than 10000 Å.

The porosity, expressed as percentage of voids, and the distribution of pore radius are determined by the mercury method described hereinafter.

Production of a porous polymer in stage (I) makes it possible to obtain a product containing the compound of the transition metal M in a significant amount and having particularly high activity in the second stage of polymerization (III). Moreover, when a rubbery copolymer is produced in stage (III), the porosity of the polymer produced in stage (I) makes it possible to work in the gas phase without particular problems. The same result cannot be obtained when the polymer produced in stage (I) is not porous.

The amount of polymer produced in stage (I) is generally greater than 2000 g/g of solid component, preferably greater than 3000 g/g, and more preferably greater than 5000 g/g.

The catalyst used in the first stage of polymerization (I) comprises the product of the reaction between:

(a) a solid component comprising a compound of a transition metal $M^I$ selected from Ti or V and not containing $M^I$-π bonds, supported on magnesium halide in active form. The solid component can also comprise an electron-donor compound (internal donor). As a rule, the internal donor is used when the solid component is used for preparing catalysts for the stereospecific polymerization of propylene, 1-butene and similar α-olefins, where high stereospecificity is necessary to obtain polymers with an isotactic index higher than 90;

(b) an alkyl-Al compound and optionally an electron-donor compound (external donor).

When stereoregular polymers are produced in stage (I), for example polymers of propylene with high isotactic index, the external donor is used for imparting the necessary high stereospecificity to the catalyst. However, when diethers of the type described in patent EP-A-361493 are used as internal donors, the stereospecificity of the catalyst is sufficiently high in itself and the external donor is not necessary.

The catalyst must be capable of giving a polymer with porosity greater than 5%.

The halides of magnesium, preferably $MgCl_2$, in active form, used as support for Ziegler-Natta catalysts, are widely known from the patent literature. U.S. Pat. Nos. 4,298,718 and 4,495,338 first described the use of these compounds in Ziegler-Natta catalysis. It is known from these patents that the halides of magnesium in active form used as support or co-support in components of catalysts for the polymerization of olefins are characterized by X-ray spectra in which the most intense diffraction line that appears in the spectrum of the non-active halide is diminished in intensity and is replaced by a halo whose maximum intensity is shifted towards lower angles compared with that of the most intense line.

The compound of the transition metal $M^I$ is selected preferably from the group consisting of: Ti halides, Ti haloalkoxides, $VCl_3$, $VCl_4$, $VOCl_3$, halo-alkoxides of vanadium.

Among the titanium compounds, the preferred are $TiCl_4$, $TiCl_3$ and the halo alkoxides of the formula $Ti(OR^I)_m X_n$ in which $R^I$ is a hydrocarbon radical with 1–12 carbon atoms or a —$COR^I$ group, X is a halogen and (m+n) is the valence of titanium.

The catalytic component (A) is advantageously used in the form of spherical particles having mean diameter between about 10 and 150 μm. Suitable methods for the preparation of said components in spherical form are described for example in patents EP-A-395083, EP-A-553805, EP-A-553806, whose description relating to the method of preparation and to the characteristics of the products is herein incorporated for reference.

Examples of internal donor compounds are ethers, esters, in particular esters of polycarboxylic acids, amines, ketones and 1,3-diethers of the type described in patent EP-A-361493.

The alkyl-Al compound (B) is generally selected from trialkylaluminiums such as $AlEt_3$, triisobutyl-Al, tri-n-butyl-Al, tri-n-hexyl-Al and tri-n-octyl-Al. It is also possible to use mixtures of trialkyl-Al's with alkyl-Al halides or alkyl-Al sesquichlorides such as $AlEt_2Cl$ and $Al_2Et_3Cl_3$.

The external donor can be the same as or can be different from the internal donor. When the internal donor is an ester of a polycarboxylic acid, such as a phthalate, the external donor is preferably selected from silicon compounds of formula $R_1R_2Si(OR)_2$, where $R_1$ and $R_2$ are alkyl, cycloalkyl or aryl radicals with 1–18 carbon atoms. Examples of silanes are methylcyclohexyldimethoxysilane, diphenyldimethoxysilane, methyl-t-butyldimethoxysilane and dicyclopentyldimethoxysilane.

The compounds of the transition metal M used in treatment stage (II) are selected from compounds of Ti, V, Zr and Hf having at least one M-π bond. Preferably, said compounds contain at least one ligand L, having a mono or polycyclic structure containing conjugated π electrons, coordinated on the metal M.

Said compound of Ti, V, Zr or Hf is preferably selected from components having the following structure:

  (i)

  (ii)

  (iii)

in which M is Ti, V, Zr or Hf; $Cp'$ and $Cp''$, equal or different, are cyclopentadienyl groups or substituted cyclopentadienyl groups; two or more substituents on said cyclopentadienyl groups can form one or more rings having from 4 to 6 carbon atoms; $R^1$, $R^2$ and $R^3$ equal or different, are hydrogen or halogen atoms or an alkyl or alkoxy group with 1–20 carbon atoms, aryl, alkaryl or aralkyl with 6–20 carbon atoms, an acyloxy group with 1–20 carbon atoms, an allyl group, a substituent containing a silicon atom; A is an alkenyl bridge or one with structure selected from:

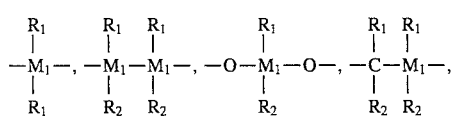

—Ge—, —Sn—, —O—, —S—, =SO, =SO$_2$, =NR$_1$, =PR$_1$ and =P(O)R$_1$, in which M$_1$ is Si, Ge, or Sn; R$_1$ and R$_2$, equal or different, are alkyl groups with 14 carbon atoms or aryl groups with 6–10 carbon atoms; a, b and c are, independently, integers from 0 to 4; e is an integer from 1 to 6 and two or more of the radicals R$^1$, R$^2$ and R$^3$ can form a ring. In the case where the Cp group is substituted, the substituent is preferably an alkyl group with 1–20 carbon atoms.

Examples of compounds of formula (I) are: (Me$_5$Cp)MMe$_3$, (Me$_5$Cp)M(OMe)$_3$, (Me$_5$Cp)MCl$_3$, (Cp)MCl$_3$, (Cp)MMe$_3$, (MeCp)MMe$_3$, (Me$_3$Cp)MMe$_3$, (Me$_4$Cp)MCl$_3$, (Ind)MBenz$_3$, (H$_4$Ind)MBenz$_3$, (Cp)MBu$_3$.

Examples of compounds of formula (II) are: (Cp)$_2$MMe$_2$, (Cp)$_2$MPh$_2$, (Cp)$_2$MEt$_2$, (Cp)$_2$MCl$_2$, (Cp)$_2$M(OMe)$_2$, (Cp)$_2$M(OMe)Cl, (MeCp)$_2$MCl$_2$, (Me$_5$Cp)$_2$MCl$_2$, (Me$_5$Cp)$_2$MMe$_2$, (Me$_5$Cp)$_2$MMeCl, (1-MeFlu)$_2$MCl$_2$, (Cp)(Me$_5$Cp)MCl$_2$, (BuCp)$_2$MCl$_2$, (Me$_3$Cp)$_2$MCl$_2$, (Me$_4$Cp)$_2$MCl$_2$, (Me$_5$Cp)$_2$M(OMe)$_2$, (Me$_5$Cp)$_2$M(OH)Cl, (Me$_5$Cp)$_2$M(OH)$_2$, (Me$_5$Cp)$_2$M(C$_6$H$_5$)$_2$, (Me$_5$Cp)$_2$M(CH$_3$)Cl, (EtMe$_4$Cp)$_2$MCl$_2$, [(C$_6$H$_5$)Me$_4$Cp]$_2$MCl$_2$, (Et$_5$Cp)$_2$MCl$_2$, (Me$_5$Cp)$_2$M(C$_6$H$_5$)Cl, (Ind)$_2$MCl$_2$, (Ind)$_2$MMe$_2$, (H$_4$Ind)$_2$MCl$_2$, (H$_4$Ind)$_2$MMe$_2$, {[Si(CH$_3$)$_3$]Cp}$_2$MCl$_2$, {[Si(CH$_3$)$_3$]$_2$Cp}$_2$MCl$_2$, (Me$_4$Cp)(Me$_5$Cp)MCl$_2$.

Examples of compounds of formula (III) are: C$_2$H$_4$(Ind)$_2$MCl$_2$, C$_2$H$_4$(Ind)$_2$MMe$_2$, C$_2$H$_4$(H$_4$Ind)$_2$MCl$_2$, C$_2$H$_4$(H$_4$Ind)$_2$MMe$_2$, Me$_2$Si(Me$_4$Cp)$_2$MCl$_2$, Me$_2$Si(Me$_4$Cp)$_2$MMe$_2$, Me$_2$SiCp$_2$MCl$_2$, Me$_2$SiCp$_2$MMe$_2$, Me$_2$Si(Me$_4$Cp)$_2$MMeOMe, Me$_2$Si(Flu)$_2$MCl$_2$, Me$_2$Si(2-Et-5-iPrCp)$_2$MCl$_2$, Me$_2$Si(H$_4$Ind)$_2$MCl$_2$, Me$_2$Si(H$_4$Flu)$_2$MCl$_2$, Me$_2$SiCH$_2$(Ind)$_2$MCl$_2$, Me$_2$Si(2-MeH$_4$Ind)$_2$MCl$_2$, Me$_2$Si(2-MeInd)$_2$MCl$_2$, Me$_2$Si(2-Et-5-iPrCp)$_2$MCl$_2$, Me$_2$Si(2-Me-5-EtCp)$_2$MCl$_2$, Me$_2$Si(2,5-Me$_2$Cp)$_2$MCl$_2$, Me$_2$Si(2-Me-4,5-benzoindenyl)$_2$MCl$_2$, Me$_2$Si(4,5-benzoindenyl)$_2$MCl$_2$, Me$_2$Si(2-EtInd)$_2$MCl$_2$, Me$_2$Si(2-iPrInd)$_2$MCl$_2$, Me$_2$Si(2-t-BuInd)MCl$_2$, Me$_2$Si(3-t-Bu-5-MeCp)$_2$MCl$_2$, Me$_2$Si(3-t-Bu-5-MeCp)$_2$MMe$_2$, Me$_2$Si(2-MeInd)$_2$MCl$_2$, Me$_2$C(Flu)CpMCl$_2$, C$_2$H$_4$(2-Me-4,5-benzoindenyl)$_2$MCl$_2$, Ph$_2$Si(Ind)$_2$MCl$_2$, Ph(Me)Si(Ind)$_2$MCl$_2$, C$_2$H$_4$-(H$_4$Ind)M(NMe$_2$)OMe, isopropylidene(3-t-BuCp)(Flu)MCl$_2$, Me$_2$C-(Me$_4$Cp)(MeCp)MCl$_2$, MeSi(Ind)$_2$MCl$_2$, Me$_2$Si(Ind)$_2$MMe$_2$, Me$_2$Si(Me$_4$Cp)$_2$M-Cl(OEt), C$_2$H$_4$(Ind)$_2$M(NMe$_2$)$_2$, C$_2$H$_4$(Me$_4$Cp)$_2$MCl$_2$, Me$_2$Si(3-MeInd)$_2$MCl$_2$, C$_2$Me$_4$(Ind)$_2$MCl$_2$, C$_2$H$_4$(2-MeInd)$_2$MCl$_2$, C$_2$H$_4$(3-MeInd)$_2$MCl$_2$, C$_2$H$_4$(4,7-Me$_2$Ind)$_2$MCl$_2$, C$_2$H$_4$(5,6-Me$_2$Ind)$_2$MCl$_2$, C$_2$H$_4$(2,4,7-Me$_3$Ind)$_2$MCl$_2$, C$_2$H$_4$-(3,4,7-Me$_3$Ind)$_2$MCl$_2$, C$_2$H$_4$(2-MeH$_4$Ind)$_2$MCl$_2$, C$_2$H$_4$(4,7-Me$_2$H$_4$Ind)$_2$MCl$_2$, C$_2$H$_4$(2,4,7-Me$_3$H$_4$Ind)$_2$MCl$_2$, Me$_2$Si(4,7-Me$_2$Ind)$_2$MCl$_2$, Me$_2$Si(5,6-Me$_2$-Ind)$_2$MCl$_2$, Me$_2$Si(2,4,7-Me$_3$H$_4$Ind)$_2$MCl$_2$.

In the simplified formulae given above, the symbols have the following meanings: Me=methyl, Et=ethyl, iPr=isopropyl, Bu=butyl, Ph=phenyl, Cp=cyclopentadienyl, Ind=indenyl, H$_4$Ind=4,5,6,7-tetrahydroindenyl, Flu=fluorenyl, Benz=benzyl, M=Ti, Zr or Hf, preferably Zr.

Compounds of the type Me$_2$Si(2-MeInd)$_2$ZrCl$_2$ and Me$_2$Si(2-Me-H$_4$Ind)ZrCl$_2$ and their methods of preparation are described respectively in European applications EP-A-485822 and 485820, the description of which is included herein for reference.

Compounds of the type Me$_2$Si(3-t-Bu-5-MeCp)$_2$ZrCl$_2$ and of the type Me$_2$Si(2-Me-4,5-benzoindenyl)ZrCl$_2$ and their method of preparation are described respectively in U.S. Pat. No. 5,132,262 and in patent application EP-A-549900, the description of which is included herein for reference.

The first stage of polymerization (I) can be carried out in liquid phase or in gas phase, working in one or more reactors. The liquid phase can consist of an inert hydrocarbon solvent (suspension process) or of one or more olefins CH$_2$=CHR (liquid monomer process). Gas-phase polymerization can be carried out using the known fluidized-bed technique or working in conditions in which the bed is agitated mechanically.

Treatment stage (II) can be carried out by contacting the polymer produced in stage (I) with solutions of the transition metal M in hydrocarbon solvents (benzene, toluene, heptane, hexane and the like). Preferably, the metallocene compound is used in solutions of hydrocarbon solvents also containing an alkyl-Al compound, such as triisobutyl-Al, AlEt$_3$ and/or a polyaluminoxane, for example poly(methylaluminoxane) (MAO). The molar ratio of the alkyl-Al compound to the metallocene compound is greater than 2 and preferably between 5 and 5000, more preferably between 5 and 1000. The treatment stage (II) can be effected by suspending the polymer produced in stage (I) in hydrocarbon solvents containing dissolved therein the compound of the transition metal M, and optionally an Al-alkyl compound and/or a polyaluminoxane, generally working at temperature between 0° and 100° C. preferably between 10° and 60° C., and removing the solvent at the end of the treatment. Alternatively, the polymer produced in (I) can be contacted with solutions of the compound of metal M containing the minimum quantity of solvent for keeping said compound in solution. Treatment stage (II) can be conveniently carried out in a loop reactor in the gas phase, in which the polymer produced in the first stage of polymerization (I) is circulated by a stream of inert gas. Solutions of the compound of the transition metal M are fed, for example with a sprayer, to the loop reactor in the gas phase, obtaining a free-flowing product at the end of the treatment.

The quantity of compound of transition metal M, expressed as metal, contained in the product obtained from treatment stage (II), can vary over a very wide range depending on the compound of transition metal M used and on the relative amount of product that is desired to produce in the various stages. Generally, such a quantity is between $1 \cdot 10^{-7}$ and $1 \cdot 10^{-3}$ g of metal M/g of product, preferably between $5 \cdot 10^{-7}$ and $5 \cdot 10^{-4}$, more preferably between $1 \cdot 10^{-6}$ and $1 \cdot 10^{-4}$. Larger amounts are, however, possible.

The second stage of polymerization (III) can be carried out in the liquid phase or in the gas phase, working in one or more reactors. The liquid phase can consist of an inert hydrocarbon solvent (suspension process) or of one or more olefins CH$_2$=CHR (liquid monomer process). Gas-phase polymerization can be effected in reactors with a fluidized bed or a mechanically-stirred bed. During the second stage of polymerization (III) it is convenient to feed into the polymerization reactor an alkyl-Al compound selected from trialkyl-Al, in which the alkyl groups have 1–12 carbon atoms, and linear or cyclic aluminoxane compounds containing the repeating unit –(R$_4$)AlO—, in which R$_4$ is an alkyl group with 1–8 carbon atoms or a cycloalkyl or aryl group with 6–10 carbon atoms, the said aluminoxane compounds containing from 1 to 50 repeating units. As a rule, the alkyl-Al compound is fed to polymerization stage (III) when the treatment stage (II) is carried out in the absence of alkyl-Al compounds.

A block diagram of the process of the invention is shown FIG. 1. Reference number 1 indicates the first stage of polymerization (I), in which one or more olefins $CH_2$=CHR are polymerized in the presence of a catalyst comprising the product of the reaction between an alkyl-Al compound and a solid component comprising at least one compound of transition metal $M^1$ not containing $M^1$-$\pi$ bonds, obtaining a porous olefinic polymer; reference number 2 indicates the treatment stage (II), in which the porous polymer produced in the first stage of polymerization is contacted with a compound of a transition metal M containing M-$\pi$ bonds and optionally with an alkyl-Al compound; reference number 3 indicates the second stage of polymerization (III) in which one or more olefins $CH_2$=CHR are polymerized in the presence of the product obtained from treatment stage (II) and optionally of an alkyl-Al compound.

The process of the invention can be used for preparing a wide range of olefinic polymer compositions. In particular, the process of the invention is particularly suitable for the preparation of high-impact polypropylene (heterophase copolymers of propylene). In fact, a further aspect of the present invention is a process for the preparation of heterophase copolymers of propylene comprising at least two stages of polymerization in which:

(A) in a first stage of polymerization, propylene or its mixture with ethylene and/or one or more olefins $CH_2$=CHR″, where R″ is a hydrocarbon radical with 2–10 carbon atoms, is polymerized in one or more reactors in the presence of a catalyst comprising the product of the reaction between an alkyl-Al compound, optionally an electron-donor compound (external donor) and a solid component comprising at least one compound of a transition metal $M^I$ selected from Ti or V and not containing $M^I$-$\pi$ bonds, a halide of magnesium in active form and optionally an electron-donor compound (internal donor), obtaining an olefinic polymer having porosity, expressed as percentage of voids, greater than 5%, content of units derived from ethylene and/or from the $CH_2$=CHR″ olefin less than 20% by weight, content of units derived from propylene greater than 80% by weight and insolubiluty in xylene greater than 60%;

(B) a treatment stage, in which the product obtained in said first stage of polymerization (A) is contacted with a compound of a transition metal M selected from Ti, V, Zr and Hf containing at least one M-$\pi$ bond and optionally with an alkyl-Al compound;

(C) a second stage of polymerization, in which one or more olefins $CH_2$=CHR, where R is hydrogen or an alkyl, cycloalkyl or aryl radical with 1–10 carbon atoms, are polymerized, in one or more reactors, in the presence of the product obtained in said treatment stage (B), obtaining a substantially amorphous olefinic (co)polymer in a quantity between 20 and 80% by weight relative to the total amount of polymer produced in stages (A) and (C).

The polymer produced in stage (A) is preferably a homopolymer of propylene with high index of isotacticity, or a crystalline copolymer of propylene that has a content by weight of units derived from ethylene and/or from the $CH_2$=CHR′ olefin, less than 10%.

Non-limiting examples of substantially amorphous olefinic (co)polymers that can be prepared in stage (C) are the elastomeric copolymers of ethylene and propylene and the elastomeric terpolymers of ethylene and propylene with smaller proportions of a diene, which have a content by weight of units derived from ethylene between about 30 and 70%; the elastomeric copolymers of ethylene and butene and the elastomeric terpolymers of ethylene, butene and propylene that have a content by weight of units derived from ethylene between about 30 and 70%; the atactic polypropylenes having high molecular weight ($\eta$>1). Examples of these copolymers are described in European patent applications EP-A-586658 and EP-A-604917 and in Italian patent applications MI-93A000943, MI-93A001405, MI-93A001406, MI-93A001960 and MI-93A001963, to which reference is made for the part relating to the characteristics of the products and to the catalysts used in their preparation.

The first stage of polymerization (A) can be conveniently carried out in liquid propylene, working in one or more loop reactors, or in the gas phase, working in one or more reactors with a fluidized bed or a mechanically-stirred bed. The gasphase technology with a fluidized bed is preferred.

The second stage of polymerization (C) is preferably carried out in one or more reactors in the gas phase with a fluidized bed. Other technologies (for example suspension polymerization or gas-phase polymerization with mechanically-stirred bed) can be used.

The porosity of the polymer produced in stage (A) is preferably greater than 15% (expressed as percentage of voids) and more preferably greater than 20%. Values of porosity that reach 35–40% or higher are possible. The distribution of pore radius is such that more than 40% of the porosity is due to pores with diameter greater than 10000 Å. Preferably, and for high values of porosity, more than 90% of the porosity is due to pores with diameter greater than 10000 Å.

The amount of polymer produced in stage (C) is preferably between 30% and 75%, more preferably between 35% and 60% by weight relative to the total amount of polymer produced in stages (A) and (C).

Figure 2:
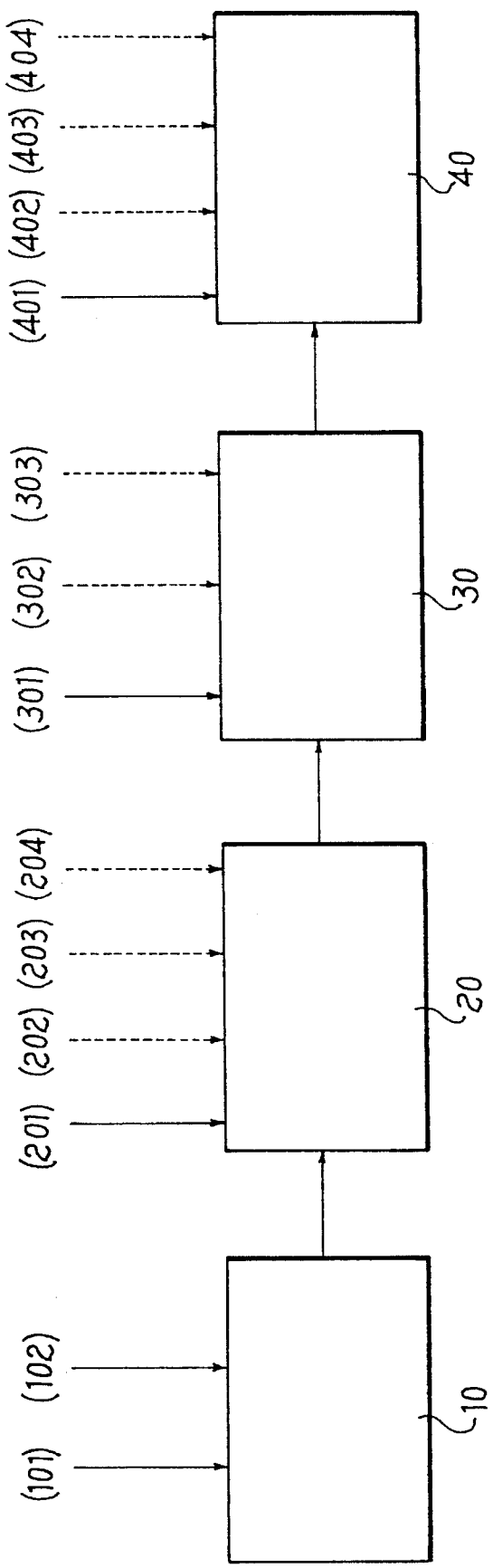
FIG. 2 shows a preferred flowsheet for the preparation of heterophase copolymers of propylene according to the multistage process of the invention.

The process is preferably effected continuously, working in both stages of polymerization (A) and (C) in fluidized-bed reactors in the gas phase, treatment stage (B) being effected in a loop reactor in the gas phase. The first stage of polymerization (A) is preferably preceded by a stage of prepolymerization in which propylene or its mixtures with ethylene and/or olefins $CH_2$=CHR″ are polymerized in the presence of the catalyst described in (A) in a quantity of between 5 and 500 g/g catalyst. A preferred flowsheet for the preparation of heterophase copolymers of propylene is shown in FIG. 2. Reference number 10 indicates the prepolymerization reactor into which the catalyst (101) and the monomers (102) are fed; prepolymerization is preferably carried out in liquid propylene or in an inert hydrocarbon solvent, for example propane.

Reference number 20 indicates the first stage of polymerization (A), carried out in one or more fluidized-bed reactors in the gas phase, into which the prepolymer produced in 10 is fed, preferably continuously; recycled monomers (201), optionally a molecular weight regulator (202), an inert gas (203) and an alkyl-Al compound (204) are also fed to the first stage of polymerization (A). Reference number 30 indicates the treatment stage (B) which is preferably carried out in the gas phase in a loop reactor into which are fed, preferably continuously, upon removal of the unreacted monomers, the porous polymer produced in 20, the compound of the transition metal M (301) and optionally an alkyl-Al compound (302); in said loop reactor, the polymer is circulated by a stream of inert gas (303). Reference number 40 indicates the second stage of polymerization (C) carried out in one or more fluidized-bed reactors in the gas-phase, into which the product coming from stage 30 is fed, preferably continuously; recycled monomers (401) and optionally a molecular weight regulator (402), an inert gas (403) and an alkyl-Al compound (404) are fed to this stage of polymerization.

Preferably the same inert gas is used in the gas-phase polymerization reactors and in the gas-phase loop reactor of stage (B). Non-limiting examples of inert gases are N2 and alkanes with 3–5 carbon atoms and preferably propane.

The following examples are given for the purpose of better illustrating the invention but do not limit it.

The properties stated are determined using the following methods:

Porosity and surface area with nitrogen: determined according to BET methodology (equipment used: SORPTOMATIC 1800 from Carlo Erba).

Size of catalyst particles: is determined by a method based on the principle of optical diffraction of monochromatic laser light with the "Malvern Instr. 2600" apparatus. The mean size is stated as P50.

Melt Index E (MIE): determined according to ASTM-D 1238, method E.

Melt Index F (MIF): determined according to ASTM-D 1238, method F.

Ratio of degrees (F/E): ratio between Melt Index F and Melt Index E.

Melt Index L (MIL): determined according to ASTM-D 1238, method L.

Flowability: is the time taken for 100 g of polymer to flow through a funnel whose discharge hole has a diameter of 1.25 cm and whose walls are inclined at 20° to the vertical.

Density: DIN 53194.

Morphology and granulometric distribution of the polymer particles: ASTM-D 1921-63.

Fraction soluble in xylene: measured by dissolving the polymer in boiling xylene and determining the insoluble residue after cooling to 25° C.

Content of comonomer: percentage by weight of comonomer determined from IR spectrum.

Effective density: ASTM-D 792.

Porosity: the porosity expressed as percentage of voids is determined by absorption of mercury under pressure. The volume of mercury absorbed corresponds to the volume of the pores. For this determination, a calibrated dilatometer (diameter 3 mm) CD3 (Carlo Erba) connected to a reservoir of mercury and to a high-vacuum pump ($1 \cdot 10^{-2}$ mba) is used. A weighed amount of sample (about 0.5 g) is placed in the dilatometer. The apparatus is then placed under high vacuum (<0.1 mmHg) and is kept in these conditions for 10 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and the apparatus is pressurized with nitrogen (2.5 kg/cm$^2$). Under the effect of the pressure, the mercury penetrates into the pores and the level goes down according to the porosity of the material. Once the level at which the mercury has stabilized has been measured on the dilatometer, the volume of the pores is calculated from the equation $V=R^2 \cdot \pi \cdot \Delta H$, where R is the radius of the dilatometer and $\Delta H$ is the difference in cm between the initial and final levels of the mercury in the dilatometer. By weighing the dilatometer, dilatometer+mercury, dilatometer+mercury+sample, the value of the apparent volume $V_1$ of the sample prior to penetration of the pores can be calculated. The volume of the sample is given by:

$$V_1 = [P_1 - (P_2 - P)]/D$$

where P is the weight of the sample in grams, $P_1$ is the weight of the dilatometer+mercury in grams, $P_2$ is the weight of the dilatometer+mercury+sample in grams, D is the density of mercury (at 25° C.=13.546 g/cm$^3$). The percentage porosity is given by the relation $X=(100 \cdot V)/V_1$.

Extractability in hexane: determined by treating 50 g of polymer with 700 cm$^3$ of n-hexane at the boiling point of the solvent for 1 hour.

EXAMPLES

Example 1

Preparation of a solid catalytic component containing Ti

A solid component containing titanium was prepared according to the procedure of Example 3 in patent EP-A-395083.

Preparation of a homopolymer of propylene [stage (I)]

In a 100 cm$^3$ glass flask, previously purged with N$_2$ at 90° C. for three hours, 0.0098 g of the above described component, 0.76 g of triethylaluminium (TEAL) and 0.313 g of cyclohexylmethyldimethoxysilane (CMMS) were precontacted in 10 cm$^3$ of hexane for 5 minutes. The mixture was then fed into a four-liter steel autoclave, previously purged with N$_2$ at 90° C. for 3 hours. Feed was effected at 30° C. in a propylene atmosphere. H$_2$ (1000 cm$^3$) and propylene (1.2 kg) were introduced and the autoclave was heated to 70° C. Polymerization was carried out for 2 hours, followed by degassing in a stream of N$_2$ at 70° C. for 1 hour. 238 g of spherical polymer with the following characteristics were obtained: MIL=3.5; porosity (% voids)=24%.

Preparation of a mixture of methylaluminoxane (MAO) and ethylenebis(tetrahydroindenyl)zirconium dichloride (EBTHI-ZrCl$_2$)

A 100 cm$^3$ glass flask, previously purged with N$_2$, was feed with 0.002 g of EBTHI-ZrCl$_2$, 0.27 g of MAO and 50 cm$^3$ of toluene, stirring the solution at 20° C. for 30 minutes.

Treatment of the homopolymer with MAO/EBTHI-ZrCl$_2$ mixture [stage (II)]

A previously-purged steel autoclave was fed with 238 g of homopolymer obtained previously and the MAO/EBTHI-ZrCl2 solution was introduced while stirring. The system was stirred continuously at 30° C. for about 30 minutes, and at the end, the solvent was removed in a stream of nitrogen at 50° C.

Ethylene/propylene copolymerization [stage (III)]

After the treatment stage (II), in the same autoclave, an ethylene/propylene mixture was fed in a 60/40 ratio up to a total pressure of 9 bar and polymerization was carried out at 50° C. for three hours, keeping the pressure constant. 340 g of heterophase copolymer were obtained in the form of spheroidal particles which had good flowability and contained 30% by weight of ethylene/propylene copolymer. The ethylene/propylene copolymer was separated from the homopolymer matrix by extraction with n-hexane and was characterized. The copolymer had the following characteristics: [η]=1.1; Mw/Mn=2.

Example 2

The Ti catalyst and the propylene homopolymer were prepared according to the procedure in Example 1.

Preparation of the mixture of methylaluminoxane (MAO) and ethylenebis(tetrahydroindenyl)zirconium dichloride (EBTHI-ZrCl$_2$)

12.5 cm³ of M-MAO (modified MAO) in a solution of Isopar C, 0.01 g of EBTHI-ZrCl₂ and 200 cm³ of anhydrous hexane were precontacted in a 250 cm³ flask, previously purged in N₂ at 90° C. for 3 hours, and stirred continuously at 20° C. for 30 min.

Treatment of the homopolymer with MAO/EBTHI ZrCl₂ mixture [stage (II)]

A gas-phase loop reactor with a volume of 1000 cm³, previously purged, was loaded with 100 g of homopolymer obtained previously, circulating it with a stream of nitrogen. The M-MAO/EBTHI-ZrCl₂ solution was introduced, by means of a sprayer, over 90 minutes and at temperature of 30° C., and at the end the polymer was obtained in the form of free-flowing particles.

Ethylene/propylene copolymerization [stage (III)]

100 g of polymer treated with the MAO/EBTHI-ZrCl₂ mixture was fed into a gas-phase reactor with a total volume of 35 l that had been previously purged with N₂ at 90° C. for 3 hours. The system was fluidized with 5 bar of propane and an ethylene/propylene mixture (60/40 ratio) was introduced up to a pressure of 9 bar at 50° C. Polymerization was carried out for 3 hours, keeping the pressure constant. 160 g of heterophase copolymer were obtained, containing 37.5% by weight of ethylene/propylene copolymer, in the form of free-flowing spherical particles. The ethylene/propylene copolymer was separated from the homopolymer matrix by extraction with n-hexane and was then characterized. The ethylene/propylene copolymer had the following characteristics: [η]=1.5; ethylene=69%; Mw/Mn=2.8.

Example 3

The Ti catalyst and the propylene homopolymer were prepared according to the procedure described in Example 1.
Preparation of the MAO, ethylene-bis-indenyl-zirconium/chloride (EBI), triisobutylaluminium (TIBAL) solution.

Into a 250 cm³ round bottomed flask, previously purged with N₂ at 90° C. for 3 hour, 110 cm³ of anhydrous toluene, 1.4 g of MAO, 0.045 g of EBI and 14 cm³ of a 100 g/l solution of TIBAL in hexane were fed; the system was kept at 20° C. for 1 hour whilst stirring, until a clear solution was obtained.

Treatment of the homopolymer with the TIBAL/MAO/EBI solution 192 g of the above described homopolymer was added to the previously described TIBAL/MAO/EBI solution by the same method described in example 2.

Copolymerization of ethylene/butene

The polymer, pre-treated with the MAO/TIBAL/EBI solution, was fed into the gas phase reactor described in example 2. The system was fluidized with 5 bar of propane at 75° C. and 330 g of ethylene and 100 g of butene were fed until a total pressure of 15 bar was reached. The reaction was carried out for 3 hours. 620 g of a polymer blend in the form of spherical particles were obtained.

Example 4

The Ti catalyst was prepared according to the process described in example 1.
Polymerization using the Ti catalyst.

The above described catalyst was used in a polymerisation process carried out under the same conditions as in example 1, the only difference being that 10 g of ethylene were fed. 240 g of an ethylene/propylene random copolymer were obtained in the form of spherical particles with the following characteristics: MIL=4.5; C₂=2.2%; porosity=23%.

Preparation of the MAO/TIBAL/Ethylene-bis-4,7-dimethyl-indenyl zirconium dichloride (EBDMI) solution Into a 250 cm³ reactor, previously purged with nitrogen at 90° C. for 3 hours, 150 cm³ of anhydrous toluene, 1.5 gr of TIBAL in hexane ([c]=100 g/l), 0.02 g of EBDMI and 0.2 g of MAO were fed. The system was kept stirred for 1 hour at 20° C.

Treatment of the copolymer with the MAO/TIBAL/EBDMI solution 200 g of the above described copolymer were treated with the MAO/TIBAL/EBDMI solution under the same conditions as described in example 2.

Ethylene/butene copolymerization 176 g of copolymer treated with the MAO/TIBAL/EBDMI solution were used in a polymerization process carried out as described in example 3, but feeding 335 g of ethylene and 200 g of butene. 310 g of a polymer blend in the form of spherical particles were obtained.

Example 5

The Ti catalyst was prepared according to the process described in example 1.
Polymerization using the Ti catalyst.

0.0116 g of the above described catalyst was precontacted with 0.25 g of TEAL in 25 cm³ of hexane for 5 minutes at 20° C. Subsequently it was fed into a 4 l steel autoclave containing 800 g of propane at 20° C. The whole was heated to 75° C. and 0.5 bar of H₂ and 7 bar of ethylene were fed. Polymerization was carried out for 3 hours obtaining about 450 g of polyethylene in the form of spherical particles.
Preparation of the MAO/TIBAL/EBI solution Into a previously purged 250 cm³ reactor 100 cm³ of toluene, 0.178 g MAO, 0.095 g EBI, 15 cm³ of a TIBAL solution in hexane ([c]=100 g/l) were fed, maintaining the mixture under nitrogen at 20° C. for 1 hour.

Treatment of the polymer with the MAO/TIBAL/EBI solution 184 g of the above described polymer was treated with the MAO/TIBAL/EBI solution according to the procedure described in example 2.

Polymerization of ethylene 113 g of the above described treated polymer was fed into a gas-phase reactor and fluidized with 8 bar of propane and 7 bar of C₂ at 75° C.; polymerization was carried out for 3 hours. 206 g of spherical form polyethylene was obtained having the following properties: MIE=0.022; F/E=52.3; [η]=3.67; MW/Mn=6.3.

We claim:

1. Process for the polymerization of one or more olefins CH₂=CHR, where R is hydrogen or an alkyl, cycloalkyl or aryl radical with 1–10 carbon atoms, characterized in that it comprises:

(I) a first stage of polymerization, in which one or more of said olefins CH₂=CHR are polymerized, in one or more reactors, in the presence of a catalyst comprising the product of the reaction between an Al-alkyl compound and a solid component comprising at least one compound of a transition metal M' selected from Ti and V and not containing M'-π bonds and a Mg halide in active form, said catalyst being capable of producing an olefin polymer having porosity, expressed as percentage of voids, greater than 5%;

(II) a treatment stage, in which the product obtained in said first stage of polymerization (I) is contacted with a compound of a transition metal M selected from Ti, V, Zr and Hf containing at least one M-π bond and optionally with an alkyl-Al compound;

(III) a second stage of polymerization, in which one or more of the said olefins CH$_2$=CHR are polymerized, in one or more reactors, in the presence of the product obtained in said stage (II).

2. Process according to claim 1, in which the porosity of the polymer produced in the first stage of polymerization (I) is greater than 10%.

3. Process according to claim 1, in which the porosity of the polymer produced in the first stage of polymerization (I) is greater than 15%.

4. Process according to claim 1, in which more than 40% of the porosity of the polymer produced in the first stage of polymerization (I) is due to pores with diameter greater than 10000 Å.

5. Process according to claim 3, in which more than 90% of the porosity of the polymer produced in the first stage of polymerization (I) is due to pores with diameter greater than 10000 Å.

6. Process according to claim 1, in which the magnesium halide is MgCl$_2$ and the compound of the transition metal M$^I$ is selected from the group consisting of: Ti halides, Ti halo-alkoxides, VCl$_3$, VCl$_4$, VOCl$_3$ and halo alkoxides of V.

7. Process according to claim 6, in which the Ti compound is selected from the group consisting of: TiCl$_4$, TiCl$_3$ and halo alkoxides of the formula Ti(OR$^I$)$_m$X$_n$, in which R$^I$ is a hydrocarbon radical with 1–12 carbon atoms or a —COR$^I$ group, X is a halogen and (m+n) is the valence of the Ti.

8. Process according to claim 1, in which the solid component used in the first stage of polymerization (I) is in the form of spheroidal particles having mean diameter between 10 and 150 μm.

9. Process according to claim 1, in which the compound of the transition metal M comprises at least one ligand L coordinated on the metal, said ligand L having a mono- or polycyclic structure containing conjugated π electrons.

10. Process according to claim 9, in which the compound of the transition metal M is selected from:

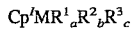   (i)

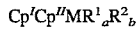   (ii)

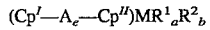   (iii)

in which M is Ti, V, Zr or Hf; Cp$^I$ and Cp$^{II}$, identical or different, are cyclopentadienyl groups or substituted cyclopentadienyl groups; two or more substituents on said cyclopentadienyl groups can form one or more rings having from 4 to 6 carbon atoms; R$^1$, R$^2$ and R$^3$, same or different, are hydrogen or halogen atoms or an alkyl or alkoxy group with 1–20 carbon atoms, aryl, alkaryl or aralkyl with 6–20 carbon atoms, an acyloxy group with 1–20 carbon atoms, an allyl group, a substituent containing a silicon atom; A is an alkenyl bridge or one with structure selected from:

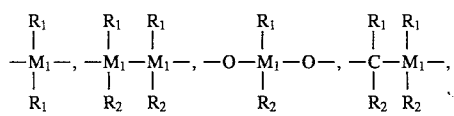

=BR$_1$, =AlR$_3$, —Ge—, —Sn—, —O—, —S—, =SO, =SO$_2$, =NR$_1$, =PR$_1$ and =P(O)R$_1$, in which M$_1$ is Si, Ge, or Sn; R$_1$ and R$_2$, equal or different, are alkyl groups with 1–4 carbon atoms or aryl groups with 6–10 carbon atoms; a, b and c are, independently, integers from 0 to 4; e is an integer from 0 to 6 and two or more of the radicals R$^1$, R$^2$ and R$^3$ can form a ring.

11. Process according to claim 9, in which the compound of the transition metal is selected from compounds having the structure:

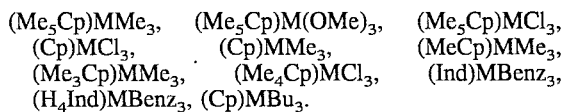

12. Process according to claim 9, in which the compound of the transition metal is selected from compounds having the structure:

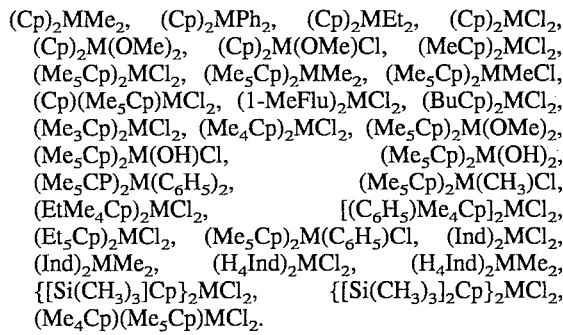

13. Process according to claim 9, in which the compound of the transition metal is selected from compounds having the structure:

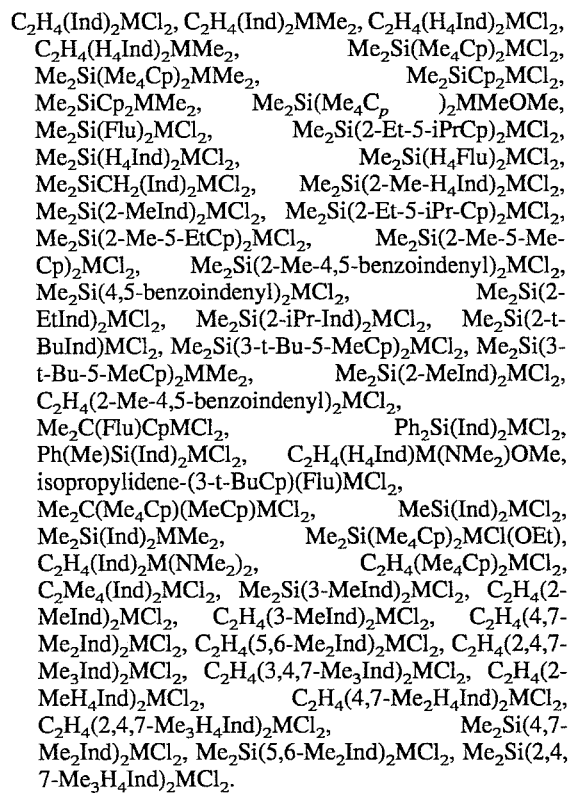

14. Process according to claim 1, in which, in the product obtained from treatment stage (II), the compound of the transition metal M is present in a quantity of between 1·10$^{-7}$ and 1·10$^{-3}$ by weight expressed as metal.

15. Process according to claim 14, in which, in the product obtained from treatment stage (II), the compound of the transition metal M is present in a quantity of between 1·10$^{-6}$ and 1·10$^{-4}$ by weight expressed as metal.

16. Process according to claim 1, in which the catalyst used in the first stage of polymerization (I) comprises the product of the reaction between an Al-alkyl compound, an electron-donor compound and a solid component comprising at least one compound of a transition metal M' selected from Ti and V and not containing M'-π bonds, a magnesium halide in active form and an electron-donor compound.

17. Process according to claim 1 in which, in the treatment stage (II), the product obtained in the first stage of polymerization (I) is treated with solutions containing the compound of the transition metal M and an alkyl-Al compound chosen from trialkyl-Al, in which the alkyl groups have from 1 to 12 carbon atoms, and linear or cyclic aluminoxane compounds containing the repeating unit —($R_4$)AlO—, in which $R_4$ is an alkyl group with 1–8 carbon atoms or a cycloalkyl or aryl group with 6–10 carbon atoms, the said aluminoxane compounds containing from 1 to 50 repeating units.

18. Process according to claim 1, in which, during the second stage of polymerization (III), at least one reactor is fed with the product obtained in the treatment stage (II) and, together or separately, an alkyl-Al compound selected from trialkyl-Al, in which the alkyl groups have from 1 to 12 carbon atoms, and linear or cyclic aluminoxane compounds containing the repeating unit —($R_4$)AlO—, in which $R_4$ is an alkyl group with 1–8 carbon atoms or a cycloalkyl or aryl group with 6–10 carbon atoms, the said aluminoxane compounds containing from 1 to 50 repeating units.

19. Process according to claim 1, in which, the first stage of polymerization (I) is carried out in the liquid phase, the said liquid phase consisting of a hydrocarbon solvent or of one or more olefins $CH_2$=CHR and in which, the second stage of polymerization (III) is carried out in the gas phase in at least one reactor with a fluidized bed or a mechanically-stirred bed.

20. Process according to claim 1, in which, in both stages (I) and (III), polymerization is carried out in the gas phase in reactors with a fluidized bed or a mechanically-stirred bed.

21. Process according to claim 1 in which, the treatment stage (II) is carried out in the gas phase in a loop reactor.

22. Process for the preparation of heterophase copolymers of propylene comprising at least two stages of polymerization in which:

(A) in at least one reactor, propylene or its mixtures with ethylene and/or one or more olefins $CH_2$=CHR'', where R'' is a hydrocarbon radical with 2–10 carbon atoms, are polymerized in the presence of a catalyst comprising the product of the reaction between an alkyl-Al compound, optionally an electron-donor compound and a solid component comprising at least one compound of a transition metal M' selected from Ti and V and not containing M'-π bonds, a halide of magnesium in active form and optionally an electron-donor compound obtaining an olefinic polymer having porosity, expressed as percentage of voids, greater than 5%, content of units derived from the ethylene and/or from the $CH_2$=CHR'' olefin less than 20% by weight, content of units derived from the propylene greater than 80% by weight and insolubility in xylene higher than 60%;

(B) the product obtained in said stage (A) is contacted with a compound of a transition metal M selected from Ti, V, Zr and Hf containing at least one M-π bond and optionally an alkyl-Al compound;

(C) in at least one reactor, one or more olefins $CH_2$=CHR, where R is hydrogen or an alkyl, cycloalkyl or aryl radical with 1–10 carbon atoms, are polymerized in the presence of the product obtained in said stage (B), obtaining a substantially amorphous olefinic (co)polymer in a quantity of between 20 and 80% by weight relative to the total amount of the polymer produced in stages (A) and (C).

* * * * *

UNITED STATES PATENT AND TRADEMARK OFFICE
CERTIFICATE OF CORRECTION

PATENT NO. : 5,589,549

DATED : December 31, 1996

INVENTOR(S): Gabriele Govoni et al.

It is certified that error appears in the above-identified patent and that said Letters Patent is hereby corrected as shown below:

Column 13, Line 63: Delete "$AlR_3$" Insert --$AlR_1$--

Signed and Sealed this

Eighth Day of April, 1997

*Attest:*

BRUCE LEHMAN

*Attesting Officer*     *Commissioner of Patents and Trademarks*